(12) United States Patent
Aardenburg (10) Patent No.: US 9,248,955 B2
(45) Date of Patent: Feb. 2, 2016

(54) CAPSULE, MEANS FOR PIERCING THE BASE OF A CAPSULE AND DEVICE FOR PREPARING A BEVERAGE

(75) Inventor: Kees Aardenburg, Lugano (CH)

(73) Assignee: SWISS CAFFE ASIA LTD., Fo Tan, Shatin, N.T. (HK)

( * ) Notice: Subject to any disclaimer, the term of this patent is extended or adjusted under 35 U.S.C. 154(b) by 1019 days.

(21) Appl. No.: 12/523,121

(22) PCT Filed: Jan. 11, 2008

(86) PCT No.: PCT/EP2008/050271
§ 371 (c)(1), (2), (4) Date: Jul. 14, 2009

(87) PCT Pub. No.: WO2008/087099
PCT Pub. Date: Jul. 24, 2008

(65) Prior Publication Data
US 2010/0064899 A1     Mar. 18, 2010

(30) Foreign Application Priority Data
Jan. 15, 2007  (EP) .................................... 07100520

(51) Int. Cl.
A47J 31/16     (2006.01)
B65B 29/02     (2006.01)
(Continued)

(52) U.S. Cl.
CPC ......... *B65D 85/8043* (2013.01); *A47J 31/3633* (2013.01); *A47J 31/3638* (2013.01); *Y10T 83/9314* (2015.04)

(58) Field of Classification Search
CPC ............. A47J 31/3633; A47J 31/3638; B65D 85/8043
USPC ............ 99/295, 302 R, 279, 289 R, 291, 293, 99/298, 323, 323.3; 426/77–79, 82, 84, 426/112, 8, 45, 569, 590, 594–597, 426/432–435
See application file for complete search history.

(56) References Cited

U.S. PATENT DOCUMENTS 2,899,886 A    8/1959  Rodth
3,445,237 A *  5/1969  Gidge ............................. 426/77
(Continued)

FOREIGN PATENT DOCUMENTS

EP    1 101 430 A1    5/2001
EP    1 344 722 A1    9/2003
(Continued)

OTHER PUBLICATIONS

English-language translation of the Preliminary Notice of Rejection dated Jul. 24, 2012 received from the Japanese Patent Office from related Japanese Application No. 2009-545893.
(Continued)

*Primary Examiner* — Dana Ross
*Assistant Examiner* — Ket D Dang
(74) *Attorney, Agent, or Firm* — Scully Scott Murphy and Presser (57) ABSTRACT

A capsule, for example for brewing coffee, comprising a rotationally symmetrically formed capsule body having a side wall and having a base formed integrally therewith. The capsule is closed by a lid to form a sealed chamber for accommodating the substance contained in the capsule. The base and lid can be pierced in order that a liquid can be channelled through the capsule. The base is provided with an annular channel, of which the inner wall portion forms a stiffening zone. The base of the channel here forms a piercing zone which, as a result of the stiffening zone, can be pierced to better effect and without the capsule base as a whole being deformed.

24 Claims, 9 Drawing Sheets

(51) Int. Cl.
 *B26F 1/24* (2006.01)
 *B65D 85/804* (2006.01)
 *A47J 31/36* (2006.01)

(56) References Cited

U.S. PATENT DOCUMENTS

| | | | | |
|---|---|---|---|---|
| 4,158,329 | A * | 6/1979 | McKnight | 99/295 |
| 4,829,889 | A * | 5/1989 | Takeuchi et al. | 99/289 P |
| 5,108,768 | A * | 4/1992 | So | 426/77 |
| 5,111,740 | A * | 5/1992 | Klein | 99/295 |
| 5,327,815 | A | 7/1994 | Fond et al. | |
| 5,472,719 | A * | 12/1995 | Favre | 426/77 |
| 5,656,311 | A * | 8/1997 | Fond | 426/84 |
| 5,656,316 | A * | 8/1997 | Fond et al. | 426/433 |
| 6,589,577 | B2 * | 7/2003 | Lazaris et al. | 426/79 |
| 6,849,285 | B2 * | 2/2005 | Masek et al. | 426/112 |
| 7,028,604 | B2 * | 4/2006 | Cortese | 99/295 |
| 7,946,217 | B2 | 5/2011 | Favre et al. | |
| 2003/0172813 | A1 * | 9/2003 | Schifferle | 99/275 |
| 2003/0217643 | A1 * | 11/2003 | Masek et al. | 99/279 |
| 2003/0222089 | A1 * | 12/2003 | Hale | 220/912 |
| 2006/0130664 | A1 * | 6/2006 | Majer Doglioni | 99/275 |
| 2006/0137532 | A1 * | 6/2006 | Doglioni Urio | 99/279 |
| 2006/0174769 | A1 * | 8/2006 | Favre et al. | 99/275 |
| 2009/0175986 | A1 * | 7/2009 | Doglioni Majer | 426/77 |

FOREIGN PATENT DOCUMENTS

| | | |
|---|---|---|
| FR | 2 617 389 | 1/1989 |
| GB | 1 256 247 | 12/1971 |
| JP | H05-192248 | 8/1993 |
| JP | 2006-528507 | 12/2006 |
| KR | 2003-0081809 A | 10/2003 |

OTHER PUBLICATIONS

Korean Examination Report dated Jan. 17, 2014 issued in corresponding Korean Application No. 10-2009-7016819.

* cited by examiner

CAPSULE, MEANS FOR PIERCING THE BASE OF A CAPSULE AND DEVICE FOR PREPARING A BEVERAGE

The invention relates to a capsule as commonly used nowadays as portion packs for preparing, for example, coffee. There is no longer any need for the user to bother about measuring out the correct quantity of coffee and, following the extraction process, the capsule, together with its contents, is disposed of.

The coffee powder, moreover, remains packaged in an aroma-tight manner in the closed chamber and is protected against moisture.

Comparable capsules have been disclosed, for example, in EP 1 101 430 or EP 1 344 722. One problem of such capsules is the piercing by means arranged outside the capsule. These means are usually assigned to a machine for preparing a beverage, in which case all that is required is for the capsule to be inserted into the machine, the force required for the piercing of the capsule being exerted manually via a lever mechanism or the like. The capsule has to be sufficiently robust in order to protect the contents against damage and to withstand deformation resulting from external forces. Moreover, it has been found that it is significantly more advantageous for the capsule to be perforated at a plurality of locations simultaneously in order to achieve optimum wetting of the coffee powder and channelling of the brewing water. These factors result in a comparatively large amount of force being required for piercing and in a high level of tearing stress in the material until penetration actually occurs. This is accompanied by the capsule wall being subjected to material expansion which may adversely affect clean piercing.

A capsule for preparing a beverage, in which a piercing means for piercing the base of the capsule is arranged in the capsule itself, has become known from GB 1 256 247. The piercing means consists of a central core in the capsule centre, which is activated through external pressure on the capsule lid. Simultaneously, the lid is pierced by a lance which introduces the liquid into the capsule. The substance located on the capsule bottom is always passed by the liquid in the direction towards the center, which impairs solubility and extractability of the substance in the bottom area.

An apparatus for preparing a beverage has become known from U.S. Pat. No. 2,899,886, with the aid of which a capsule in a closed brewing chamber can be passed by a liquid. During closure of the brewing chamber, the capsule is pierced on the bottom and on the lid by a plurality of lances arranged concentrically. This apparatus is not suited, however, for extraction under high pressure and at high flow rates.

It is thus an object of the invention to provide a capsule of the type mentioned in the introduction which can be pierced, in a zone which is provided specifically for this purpose, if possible by a multiplicity of piercing means without the base of the capsule being deformed in an undesired manner. In addition, an optimum direction of flow through the substance is to be achieved.

According to an aspect of the disclosure, a capsule is provided, which can achieve certain advantages including the one discussed above. The substance for preparing the beverage rests directly on the base of the capsule, that is to say it is not separated off by additional filter layers, which may render piercing even more difficult. The base of the capsule has an annular channel, of which the inner wall portion forms a preferably frustoconical stiffening zone which tapers preferably towards the lid. This stiffening zone prevents the capsule base from sagging in an inadmissible manner during build-up of the tearing stress immediately prior to piercing. The necessary tearing stress thus builds up abruptly, and this allows clean piercing of the capsule base at the pierceable zone in the base of the channel. A frustoconical stiffening zone has proven advantageous for reasons relating to production and strength.

Of course, depending on the design of the inner wall portion, the stiffening zone could also be configured in some other way. The height of the inner wall portion, in relation to the longitudinal centre axis of the capsule, may be smaller than the average diameter of the inner wall portion, thus achieving a sufficient ratio between the height and diameter of the wall portion.

A further advantage of the annular channel with the pierceable base region consists in that, when the brewing water is channelled through from the lid towards the base, with a corresponding forcing-in pressure, the liquid first accumulates in the channel. Immediately prior to the extract being channelled away through the perforated locations, a kind of preliminary extraction takes place here in the channel. The outer wall portion of the channel can likewise widen, preferably frustoconically, towards the lid and merge directly into the side wall of the capsule. It is also conceivable, however, for the outer wall portion of the channel to widen preferably frustoconically towards the lid and to merge into the side wall by way of a shoulder or by way of a radius. Material stiffening which assists the piercing is also achieved on the outside of the annular penetration zone by way of this shoulder or radius. It may be expedient here if the inner wall portion of the channel extends into the plane of the shoulder or of the beginning of the radius between the outer wall portion and the side wall.

The ratio of piercing zone to stiffening zone can be optimized if the wall thickness of the base in the region of the pierceable zone is smaller than at the inner and/or the outer wall portion of the annular channel.

The wall thickness at the inner wall portion can here be at least 1.5 times to 2 times as large as on the base of the channel. It has proven particularly advantageous if the wall thickness at the inner wall portion is between 0.20 and 0.36 mm, preferably 0.28 mm, and at the base of the channel between 0.1 and 0.2 mm, preferably 0.15 mm. These values refer for example to a polypropylene capsule body. The side wall of the capsule body or the central base portion, respectively, can also be configured in the same manner as the inner wall portion as far as wall thickness is concerned. A very stiff base construction can be produced in this manner.

The inner wall portion can advantageously delimit a cup-like cavity extending towards the inside of the capsule and open towards the outside. This cavity in the extraction chamber is used to be engaged by a complementary elevation which stabilizes and centres the capsule base. In certain cases it would be also conceivable, however, for the inner wall portion to delimit not a cavity, but a massive body, so that the base of the capsule extends in an entirely plane manner.

Further advantages may be achieved if, at its lid end, the inner wall portion merges into a central base section which preferably runs parallel to the base of the channel. The central base section can run in the plane of the shoulder or of the beginning of the radius between the outer wall portion and the side wall.

It has proven particularly advantageous if the wall thickness of the central base section is greater than at the base of the channel and preferably also greater than at the inner and/or at the outer wall portion. A wall thickness of 0.50 to 0.70 mm, preferably 0.60 mm, has proven of particular value here. A very stiff central base portion not subjected to concentric deflection is formed in this manner.

At its lid end, however, it is also possible for the inner wall portion to merge into a concavely inwardly curved central base section. This achieves a cupola-like effect, which stiffens the inner wall portion of the channel in a particularly advantageous manner. However, at its lid end, the inner wall portion can merge just as well into a convexly outwardly curved central base section. This achieves the same effect as the concave curvature. Moreover, the central base section may be configured in a flexible manner such that it can be pushed concavely inwards by a force exerted from the outside. This could result, for example, in the capsule volume being reduced and thus in the substance located therein being compacted. Such a deformation of the base could also achieve a small amount of positive pressure, and this could further assist the piercing.

The capsule bodies for the capsules described above are advantageously provided with a side wall having a stacking edge devised to be supported by a further capsule body, which is arranged in a manner such that in the case of stacked capsule bodies the inner wall portions of the channel are arranged at a distance to one another. This measure prevents the frustoconically inclined inner wall portions from being mutually keyed when stacked, which would make it clearly difficult for a stack to be singled in a production line.

The invention also relates to a means for piercing the base of a capsule described above, having a base plate with an annular piercing zone on which a plurality of piercing elements are arranged, a preferably frustoconical elevation being arranged in the centre of the piercing zone. This central elevation, clearly, passes into the central recess in the base of the capsule and thus causes the capsule to be centred during piercing.

The piercing zone preferably forms likewise an annular trough, which corresponds with the annular channel of the capsule.

The piercing elements can form bodies which taper towards a tip or towards a cutting edge and have an outflow channel which extends through the base plate and opens towards at least one side surface of the body. Such piercing elements clearly serve not just to actually pierce the capsule, but also directly to channel away the liquid. The openings in the side surfaces of the bodies here may be covered by a straining film. The filtering or straining action as the liquid is channelled away is achieved here directly at the piercing elements. The straining film may be provided with openings which are so fine that even extremely fine solid particles are retained. Instead of the straining film, however, it would also be conceivable for the piercing elements to be provided with a plurality of very fine bores leading into the outflow channel from the outside.

The openings of the outflow channel may each be arranged in a side surface of the bodies which is directed towards the central elevation. This gives rise, during the extraction process in the capsule, to a flow which runs outwards from the centre towards the piercing elements.

As an alternative to the design described above, the piercing elements can also be embodied as multi-surface hollow bodies, at least one of the surfaces being a surface inclined against the piercing direction, on which openings are arranged in a perforated strainer structure. Such piercing bodies can be produced easily and they also provide optimum filtration action.

The piercing elements here may be approximately of the same height as the preferably frustoconical elevation in the centre. Moreover, it is possible for a helical compression spring to be arranged on the preferably frustoconical elevation, and its free end can be positioned on the base of a capsule which can be pressed against the base plate. This helical compression spring gives rise to a force which is directed away from the base plate and makes it easier for the capsule to be detached from the base plate or from the piercing elements respectively. The central elevation on the capsule base clearly also serves, inter alia, to centre this helical compression spring.

Finally, the invention also relates to a device for preparing a beverage. This device allows the lid and the base of the capsule to be pierced simultaneously, while it is possible for the two chamber parts to be opened and closed in different ways. Also, the relative position of the capsule at the point in time at which piercing takes place is basically irrelevant.

Further advantages and individual features of the invention can be gathered from the exemplary embodiments described herein below and from the drawings, in which.

Figure 1:
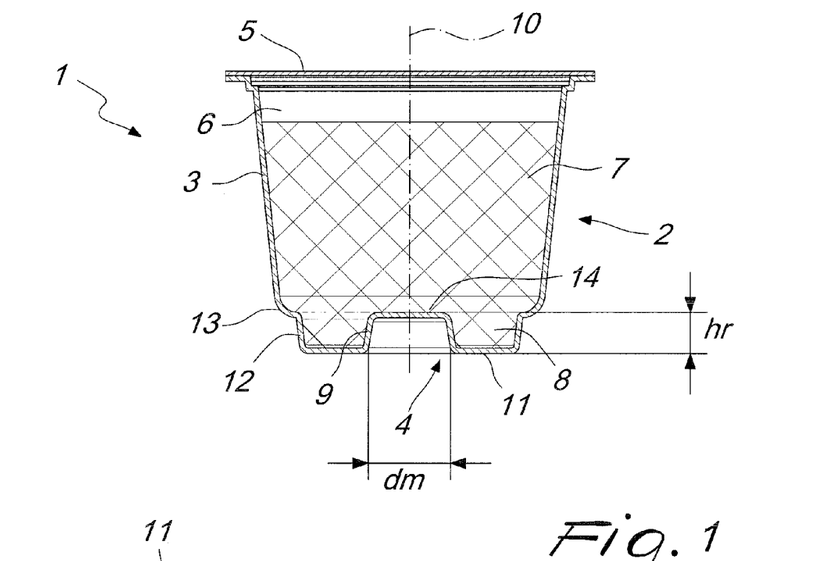
FIG. 1 shows a cross section through a first embodiment of a capsule according to the invention.
Figures 2, 3:
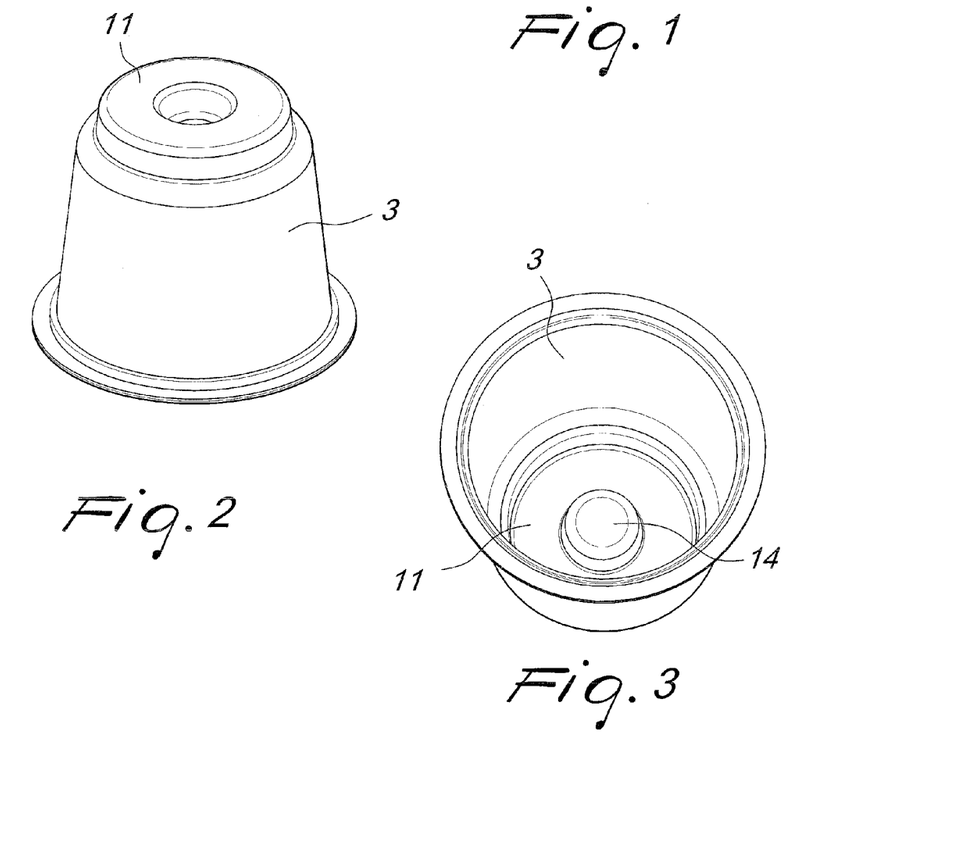
FIG. 2 shows a perspective illustration of the capsule according to FIG. 1 with a view of the base.
FIG. 3 shows a perspective illustration of the capsule according to FIG. 1 with a view of the inside of the capsule.

As can be seen from FIGS. 1 to 3, a capsule, which is designated as a whole by 1, consists of a preferably rotationally symmetrical capsule body 2 made up of a side wall 3 which merges seamlessly into a base 4. The capsule body 2 may be produced, for example, by deep drawing or injection moulding, and is preferably made of a plastic material, e.g. polypropylene. Other materials or laminates are also readily conceivable.

The cup-like capsule body 2 is closed, at its top end, by a lid 5, which preferably likewise consists of plastic material and is welded on, or adhesively bonded, in the circumferential region of the capsule body. The capsule thus forms a closed, hermetically sealed chamber 6, which is filled with a substance 7 for preparing a beverage. The filling need not necessarily correspond to the maximum possible volume of the chamber 6. For protection of the filling, the chamber 6 may also be filled with an inert gas. The substance 7 may be, for example, coffee powder or tea, an extraction process taking place as hot water flows through the capsule. However, it would also be possible for the substance 7 to be, for example, a dry extract which, as hot or cold water flows through it, dissolves fully with no residues being left behind in the capsule. For example a dry extract for making a fruit drink or a clear soup would be conceivable.

The substance 7 rests directly on the base 4 of the capsule body 2 without the interposition of filter layers or the like. This requires the special method of piercing the capsule base, and the configuration of the capsule base itself, which will be described herein below. This capsule base has an annular channel 8, of which the inner wall portion 9 tapers preferably frustoconically in diameter in the direction of the lid. The outer wall portion 12 of the channel 8 widens preferably with the same angular inclination relative to the longitudinal centre axis 10 as the inner wall portion 9. The height hr of the channel 8, as seen in the direction of the longitudinal centre axis 10, is advantageously smaller than the average diameter dm of the inner wall portion 9 and preferably also smaller than the average width of the channel. The inner wall portion 9 forms a stiffening zone which resists piercing at the base 11 of the channel. The same function may also be performed by the outer wall portion 12, it being advantageous for the wall thickness of the inner wall portion 9 and of the outer wall portion 12 to be increased somewhat, in particular as compared to the base 11 of the channel.

The top lid end of the inner wall portion 9 merges into a central base section 14 which runs parallel to the base 11 of the channel. In the same plane of the central base section 14, the outer wall portion 12 merges into the side wall 3 by way of a radius 13. This transition could also be made by way of a shoulder running at right angles to, or obliquely in relation to, the longitudinal centre axis 10.

Figure 4:
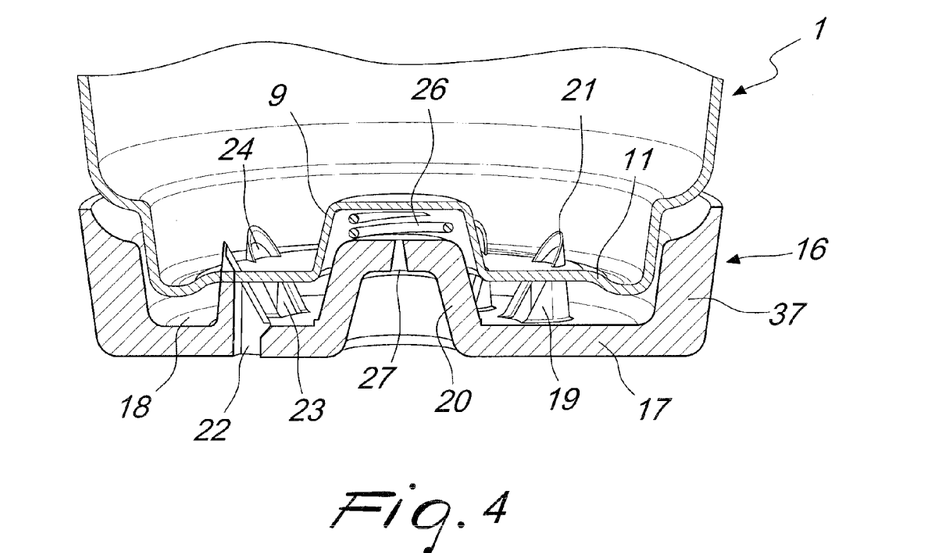
FIG. 4 shows a perspective sectional view of the bottom of the capsule according to FIG. 1 during piercing by way of a piercing means.
Figure 5:
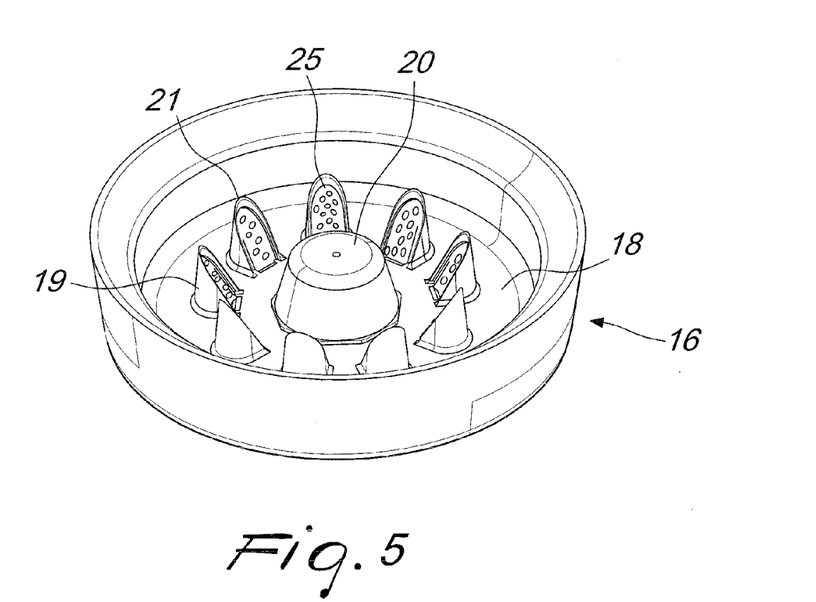
FIG. 5 shows a perspective illustration of the piercing means according to FIG. 4 in its entirety.

FIGS. 4 and 5 illustrate a means 16 which is suitable for piercing the base 4 of the capsule 1. This means has a base plate 17 with a central, preferably frustoconical elevation 20 and with an encircling outer wall 37. This results in an annular trough or penetration zone 18 in which a plurality of piercing elements 19 are arranged preferably in a circular manner. These have the form of obliquely cut cylinders or cones with a tip or cutting edge 21 directed towards the lid of the capsule. An outflow channel 22 runs through each piercing element, and also extends through the base plate 17. Each outflow channel opens towards a piercing-element side surface 23 located beneath or inside, respectively, a tip or cutting edge 21. As is illustrated in the exemplary embodiment, all the side surfaces 23 are directed towards the centre or the elevation 20.

In order to achieve a filtering action, the openings 24 in the side surfaces 23 are covered by a straining film 25 (FIG. 5). Such films are also referred to as microstraining films, it being possible for the size of the openings to be selected as desired in dependence on the filtering action required. The film sections may be fastened to the side surfaces 23 by welding.

As can be seen from FIG. 4, a helical compression spring 26 may also be fastened to the central elevation 20, this spring being compressed to the full extent during the piercing process, which makes it easier for the capsule to be subsequently detached. Moreover, a through-opening 27 may be arranged in the centre of the elevation 20, this through-opening preventing an air cushion from building up above the elevation 20.

Figure 6:
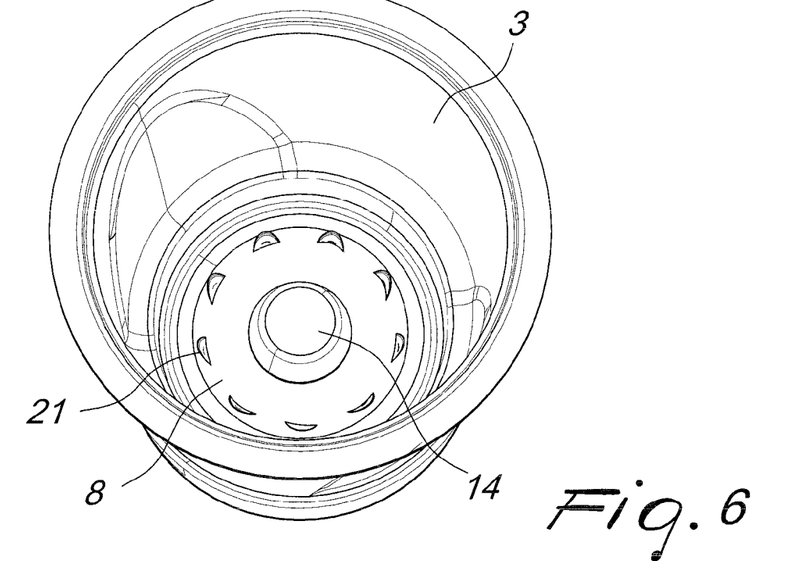
FIG. 6 shows a perspective illustration with a view into the interior of the capsule according to FIG. 4.

FIG. 6 shows the same situation during piercing of the capsule base as FIG. 4, i.e. immediately after the points of the piercing elements 19 have pierced the base 11 of the channel in the capsule, although the entire cross section of the openings 24 has not yet been exposed. As can be seen from FIG. 4 in particular, the base 11 of the channel may be raised somewhat in relation to the unloaded position (FIG. 1) during piercing. However, as a result of the stiffening by way of the inner wall portion 9, the base 11 remains plane-parallel, the piercing thus being countered by a high level of resistance. The tearing stress which is necessary for the piercing is achieved immediately here and the base 11 does not undergo any inadmissible sagging.

Figure 7:
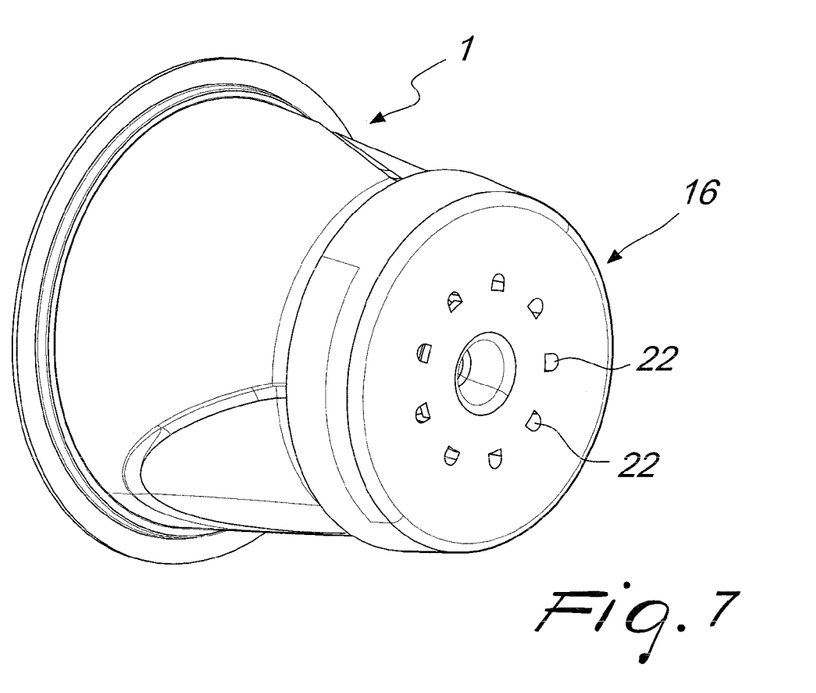
FIG. 7 shows a perspective illustration with a view of the base of the piercing means according to FIG. 4.

As soon as pressure starts to build up in the capsule, the base of the capsule is pressed in a positive and pressure-tight manner against the base plate 17 and the maximum outflow cross section is thus achieved at the openings 24. The extract then flows through the outflow channels 22 (FIG. 7), where it can be suitably collected and channelled away.

Figure 8:
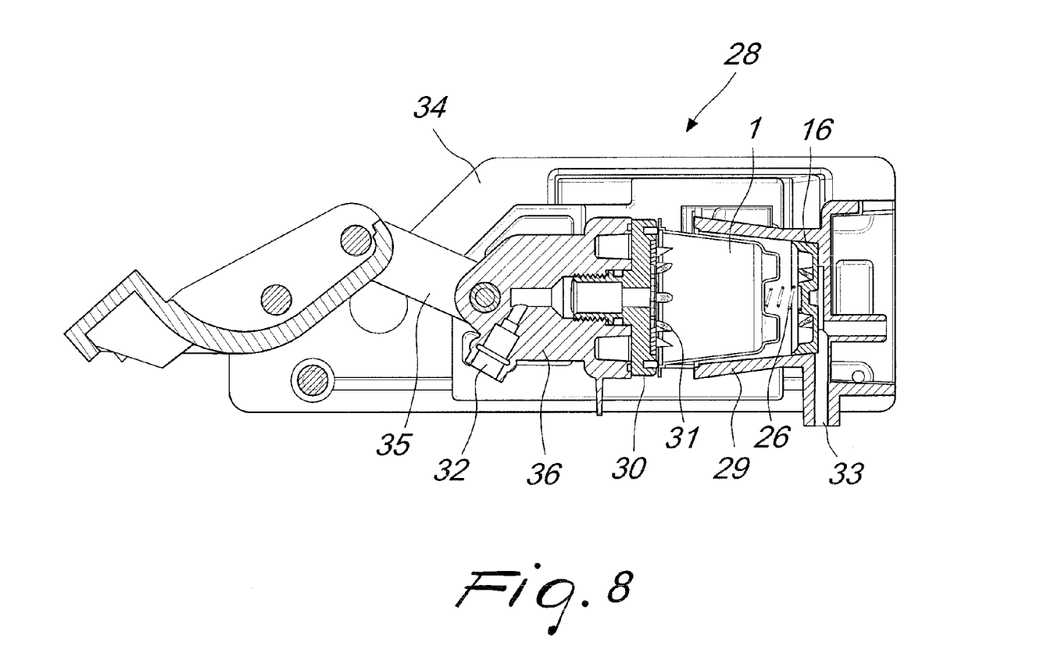
FIG. 8 shows a brewing device for a capsule according to FIG. 1 prior to closure of the cavity.
Figure 9:
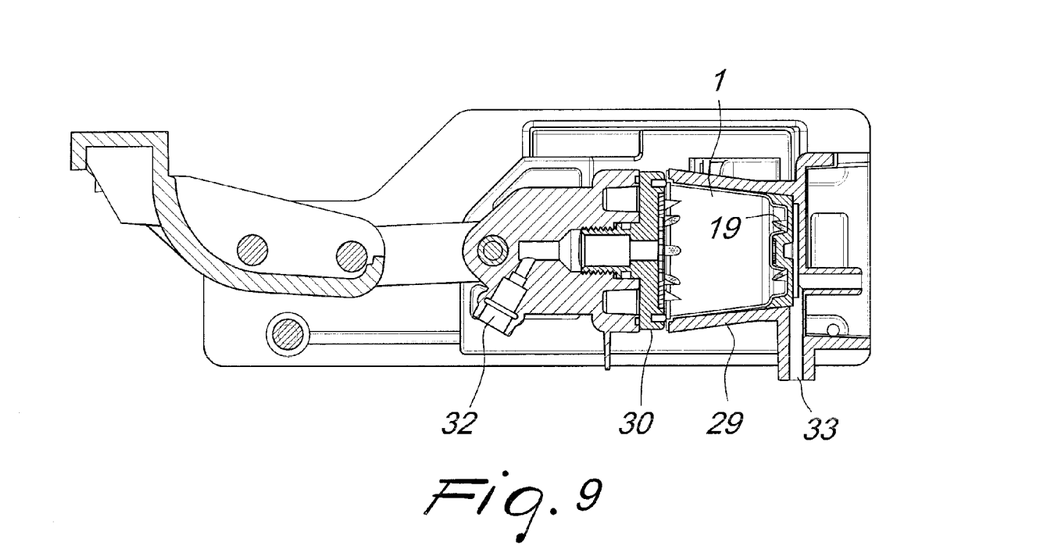
FIG. 9 shows the device according to FIG. 8 with the cavity closed.

FIGS. 8 and 9 show a cross section through a brewing module of a coffee machine for a capsule according to FIG. 1, with use being made of a piercing means 16 according to FIG. 5. The essential elements of this device 28 consist of a capsule holder 29, with the above described piercing means 16 incorporated in its base. The capsule holder may be closed off or sealed by a closure part 30 to form a brewing chamber. The closure part, for its part, is provided with a plurality of piercing elements 31, which may be designed and arranged in a manner similar to those on the piercing means 16. The closure part 30 is fastened to a mount 36 which can be moved linearly towards the capsule holder 29, and away from the latter, in a framework 34 with the aid of a lever mechanism 35.

With the brewing chamber fully closed according to FIG. 9, the lid and the base of the capsule 1 have been pierced to the full extent. Via a pump (not illustrated here), brewing water is channelled in via an inflow 32 and channelled through the capsule, from the lid towards the base. The extract, that is to say, for example, the prepared coffee, flows out via an outflow 33.

Figure 10:
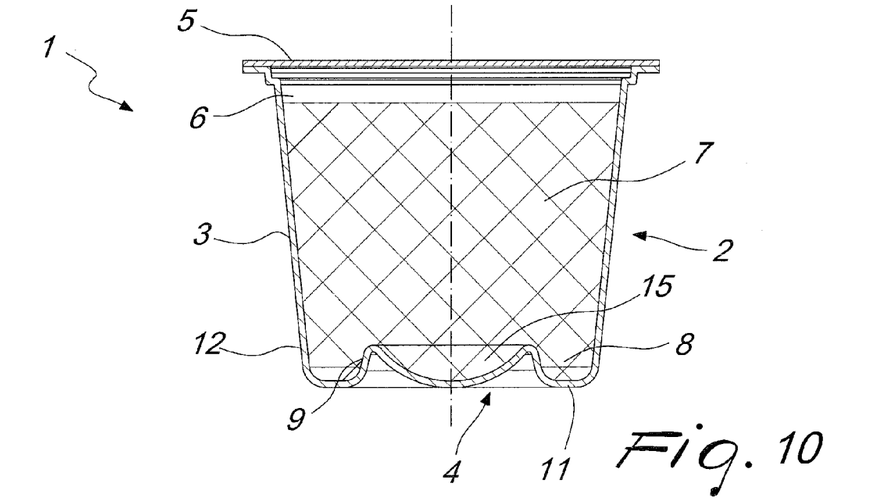
FIG. 10 shows a cross section through a second embodiment of a capsule according to the invention.
Figures 11, 12:
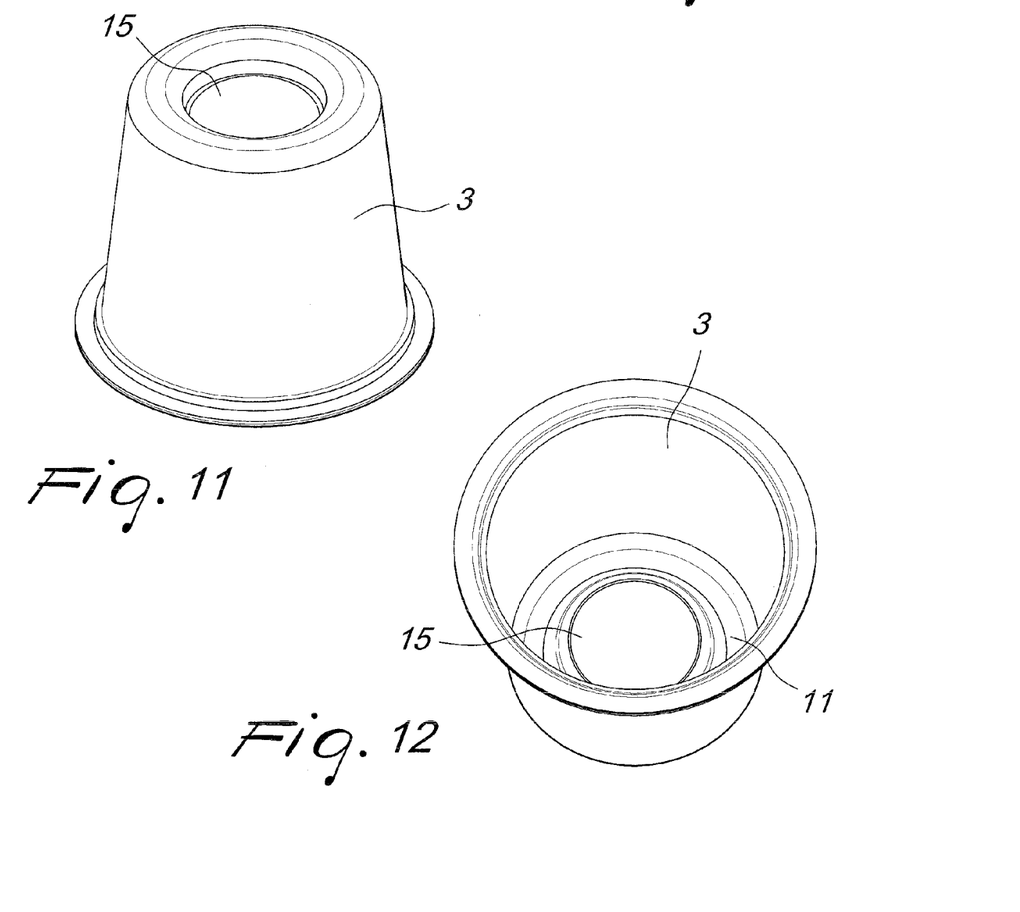
FIG. 11 shows a perspective illustration of the capsule according to FIG. 10 with a view of the base.
FIG. 12 shows a perspective illustration of the capsule according to FIG. 10 with a view into the interior of the capsule.

In the case of the exemplary embodiment according to FIGS. 10 to 12, the capsule 1 differs from that according to FIG. 1 insofar as the inner wall portion 9 of the annular channel 8 merges, at its lid end, into a convexly curved central base section. Moreover, the outer wall portion 12 of the channel 8 merges seamlessly, and without any change in diameter, directly into the side wall 3. The central wall portion 15 is designed such that it can be pushed towards the lid 5 by a force exerted from the outside, as a result of which, clearly, the volume of the chamber 6 is somewhat reduced.

Figure 13:
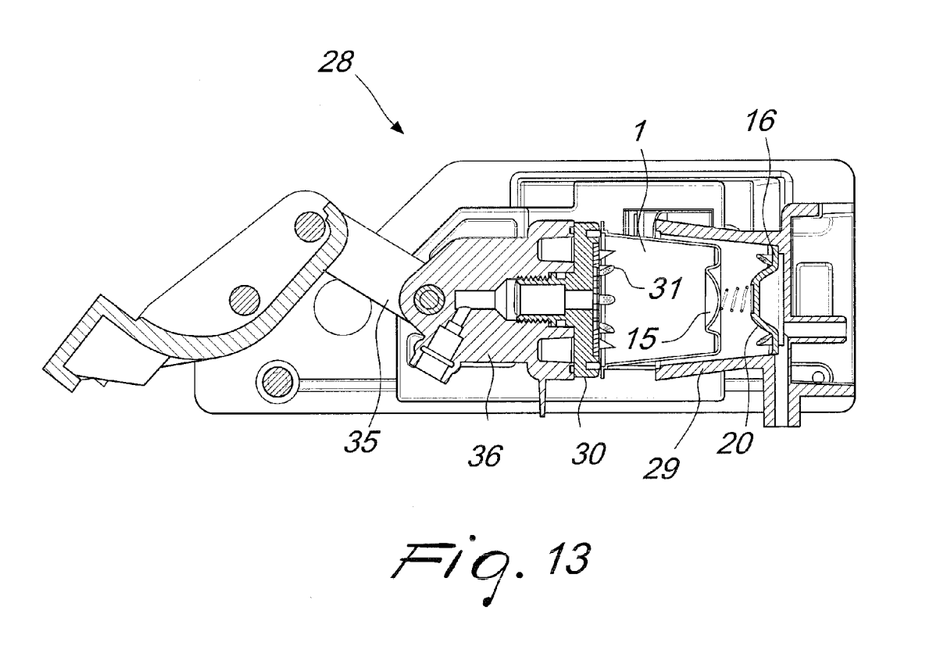
FIG. 13 shows a cross section through a brewing device for brewing the capsule according to FIG. 10, the cavity being open.
Figure 14:
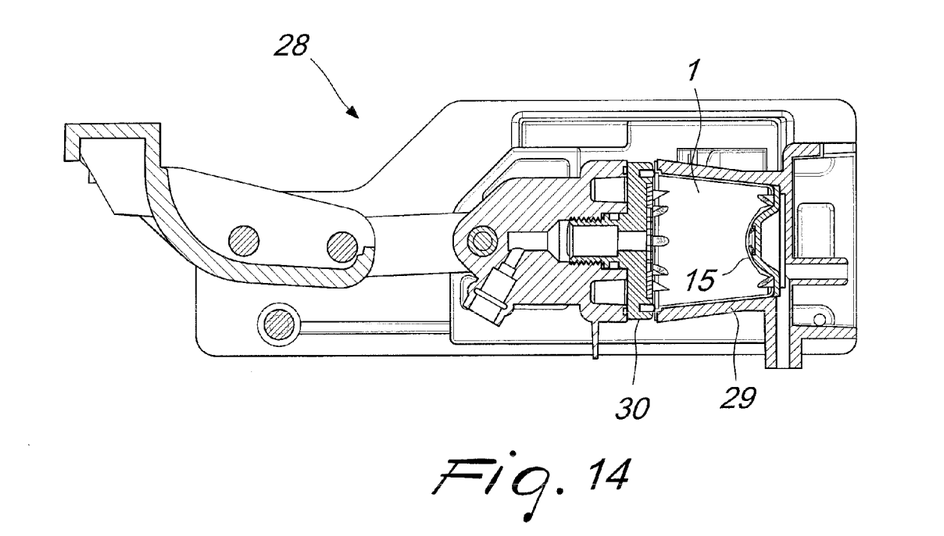
FIG. 14 shows the device according to FIG. 13 with the cavity closed.

This operation is illustrated in the device 28 according to FIGS. 13 and 14. When the brewing chamber is closed by virtue of the capsule holder 29 and the closure part 30 being brought together, the central base section 15 is still curved convexly outwards. The helical compression spring 26, however, already butts against this base section and subjects the latter to an increasing force. The elevation 20 in the piercing means 16 by the way is dome-shaped rather than frustoconical here.

Even before the closed position according to FIG. 14 has been reached, the central base section 15 is pushed concavely inwards towards the lid of the capsule, as a result of which the capsule contents are slightly compressed. This allows the coffee powder to be compacted and thus improved extraction can be achieved.

Figure 15:
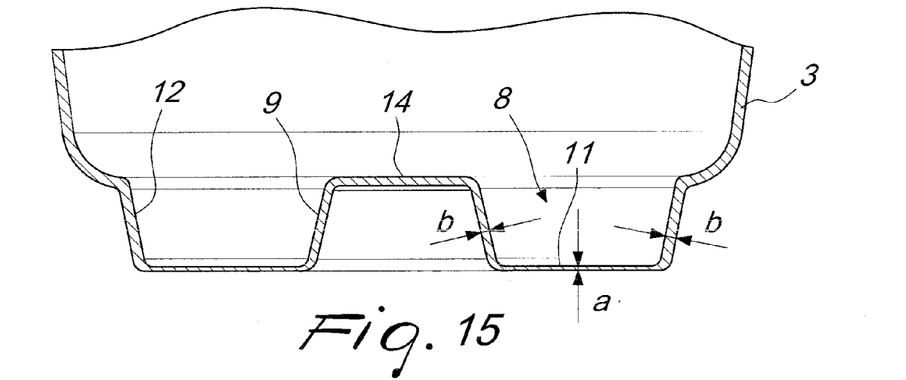
FIG. 15 shows a cross section through a capsule base with a frustoconical stiffening zone.

FIG. 15 shows, once again, a cross section through a capsule base, the stiffening zone being of frustoconical design, as in FIG. 4. The inner wall portion 9 of the annular channel 8 thus tapers at a certain angle in the direction of the lid. The central base section 14 which remains runs plane-parallel to the base 11 of the channel. The difference between the wall thickness a at the base 11 of the channel and the wall thickness b at the inner wall portion 9 and at the outer wall portion 12 can clearly be seen here. This ensures that piercing at the base is as easy as possible.

Figure 16:
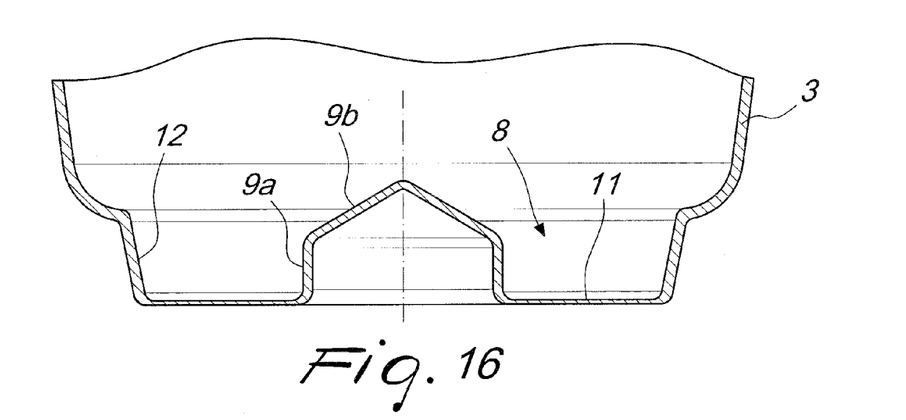
FIG. 16 shows a cross section through a capsule base with a cylindrical and conical stiffening zone.

In the case of the exemplary embodiment according to FIG. 16, the stiffening zone forms a cylindrical body which tapers conically in the direction of the lid. The inner wall portion of the channel 8 is thus clearly made up of a cylindrical section 9a and a conical section 9b.

Figure 17:
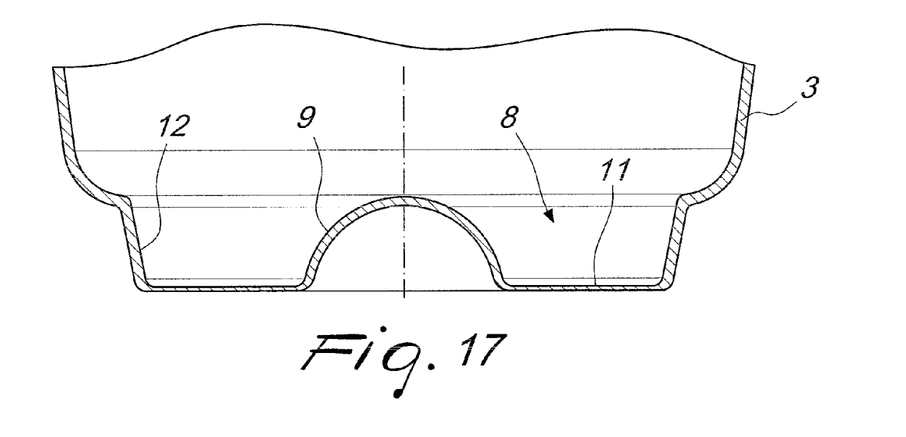
FIG. 17 shows a cross section through a capsule base with a dome-shaped stiffening zone.

In the case of the exemplary embodiment according to FIG. 17, the stiffening zone is dome-shaped, the dome in this case being spherical. The inner wall portion 9 clearly forms a spherical section here.

FIG. 18 shows again a capsule, in which the outer wall portion 12 of the channel 8 merges, as in the exemplary embodiment according to FIG. 10, directly into the side wall 3. The central base section 14 is, however, of the same design as in the exemplary embodiment according to FIG. 1, that is to say, plane-parallel to the base 11 of the channel. Furthermore the capsule 2 body is provided with an encircling stacking edge 38 in the lid region. This edge is designed as a transition from a cylindrical to a frustoconical wall portion. In the case of this exemplary embodiment the entire capsule body with the exception of the base 11 of the channel has a uniform wall thickness of for example about 0.3 mm. The wall thickness in the annular-shaped base 11 of the channel 8, in contrast, is only 0.15 mm.

Figure 19:
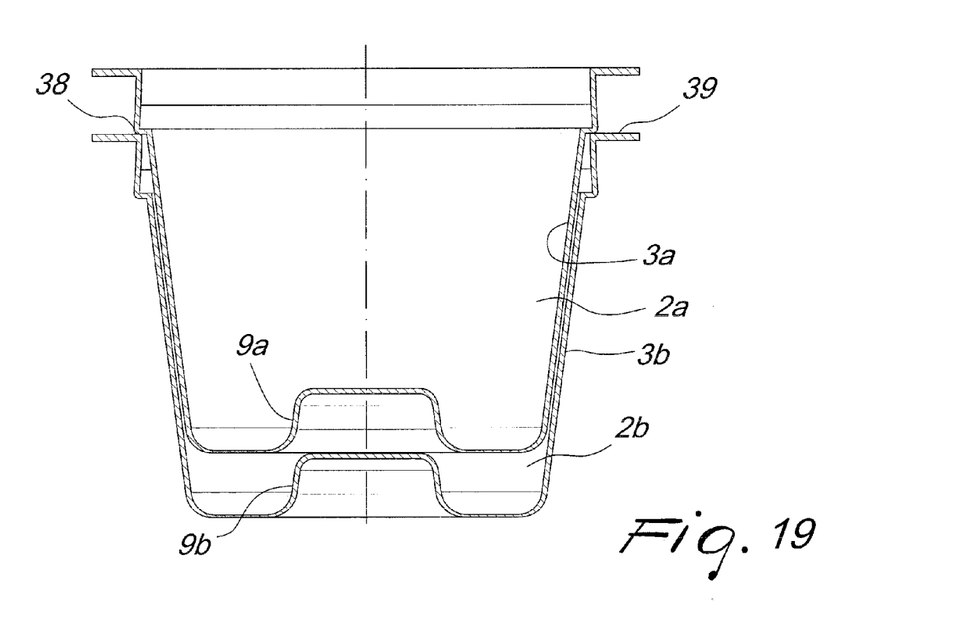
FIG. 19 shows a cross section through two stacked capsule bodies with a stacking edge.

FIG. 19 shows two capsule bodies 2a and 2b in stacked condition. As illustrated, the stacking edge 38 of the capsule body 2a rests on the circumferential flange 39 of the lower capsule body 2b. The side walls 3a and 3b of the capsule body are not completely adjacent to one another and have a small mutual clearance. Moreover the dimension of the distance of the stacking edge from the flange 39 is such that the inner wall portions 9a and 9b are likewise spaced from one other. This measure prevents the capsule bodies from keying one into the other. In a production line the capsule bodies are introduced as stacks and singled automatically in order to be filled.

Figure 18:
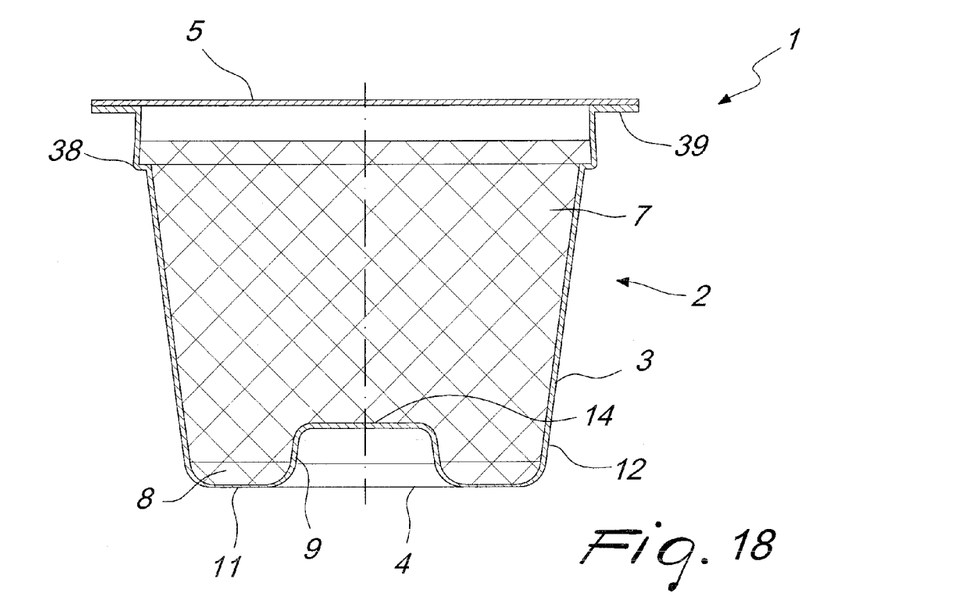
FIG. 18 shows a cross section through a capsule with a stacking edge.
Figure 20:
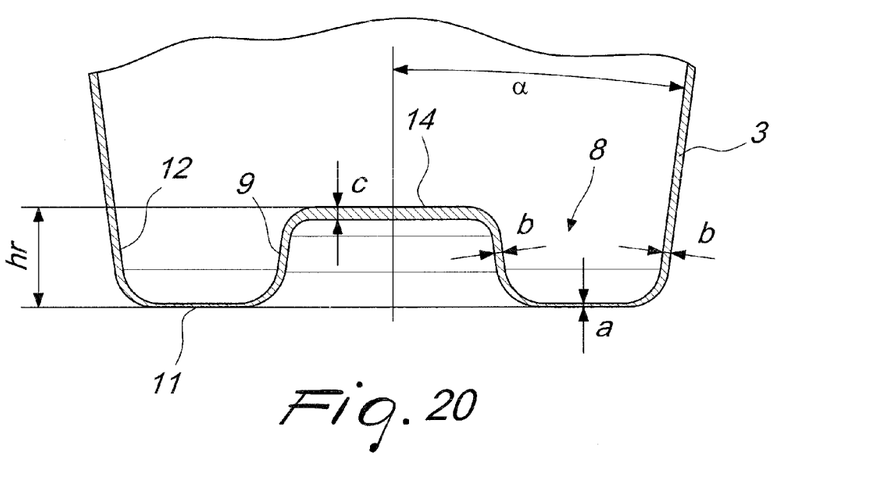
FIG. 20 shows a cross section through a capsule base of an alternative exemplary embodiment.

FIG. 20 shows an alternative exemplary embodiment of a capsule, whose design at the base region is similar to that of the exemplary embodiment according to FIG. 18. The central base section 14 has, however, a wall thickness c, which is, clearly visibly, greater than the wall thickness b of the inner wall portion 9 and the outer wall portion 12 or of the capsule side wall 3, respectively, and considerably higher than the wall thickness a at the base 11 of the channel 8. The wall thickness b in this exemplary embodiment is about 0.28 mm, whereas the wall thickness a is 0.15 mm and the wall thickness c is 0.6 mm. The angle of inclination a of the side wall 3 in relation to the central centre axis is about 7.5°. At such an angle of inclination it is still possible to stack the single capsule bodies without reciprocal keying, for which reason they can also be demoulded from the tool in a relatively easy manner.

Figure 21:
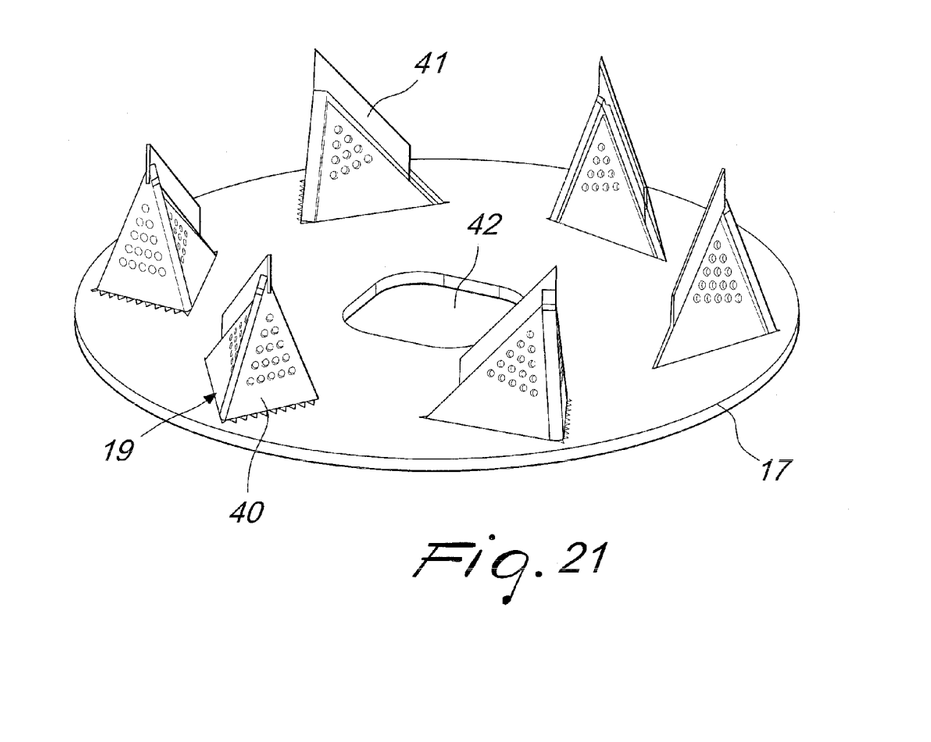
FIG. 21 shows a perspective illustration of an alternative piercing means.

FIG. 21 shows an alternative exemplary embodiment of a piercing means. Contrary to the exemplary embodiment according to FIG. 5 this piercing means consists only of a flat disc 17, on which a plurality of tent-like or pyramid-shaped penetration elements 19 are arranged in annular form. These consist of bore side walls 40, which are inclined against the piercing direction, one side wall each being able to be punched out of the material of the disk 17 and erected. The two remaining bore side walls are then applied and welded to the disk or to the erected bore side wall, respectively. To make piercing of the capsule base even easier, additional knife edges 41 can be incorporated. The bore side walls 40 can have very fine openings, similar to the straining film describe above. The piercing bodies formed in this manner penetrate easily into the base channel of the capsule and give rise to a rapid outflow of the liquid with a very good straining action.

The central opening 42 in the disk 17 serves, on the one hand, to fasten the disk in the capsule support and, on the other hand, also to fasten the frustoconical elevation, which is not represented here.

Alternative embodiments for forming the central stiffening zone are, of course, conceivable. In particular, the inner wall portion could have different angles of inclination, degrees of curvature or wall thicknesses. For capsule bodies which are produced by injection moulding, it would be conceivable, moreover, to stiffen the stiffening zone in the centre of the annular channel by way of additional wall sections, e.g. by way of star-shaped lamellae. The means for piercing the base of the capsule is always adapted, in the centre of the annular piercing zone to the configuration of the stiffening zone, in order to ensure optimum centring.

The invention claimed is:

1. A capsule consisting of a rotationally symmetrically formed capsule body having a side wall, a base formed integrally with the side wall, and a lid which covers the capsule body and is intended for forming a closed chamber that contains a substance for preparing a beverage, the lid and the base being pierceable by means arranged outside the capsule for a liquid to be channeled through the chamber from the lid towards the base,
    wherein the substance rests directly on the base of the capsule,
    wherein the base comprises an outer wall portion and an inner wall portion for defining an annular channel, wherein the inner wall portion forms a frustoconical stiffening zone which tapers towards the lid, wherein the base further comprises a pierceable zone defined between the outer wall portion and the inner wall portion, and
    wherein the pierceable zone has a consistent wall thickness, which is smaller than a wall thickness of the inner wall portion or the outer wall portion.

2. The capsule according to claim 1, wherein a height of the inner wall portion, referring to the longitudinal centre axis of the capsule, is smaller than an average diameter of the inner wall portion.

3. The capsule according to claim 1, wherein the outer wall portion of the annular channel widens frustoconically towards the lid and merges directly into the side wall of the capsule body.

4. The capsule according to claim 1, wherein the outer wall portion of the annular channel widens frustoconically towards the lid and merges into the side wall of the capsule body by way of a shoulder or by way of a radius.

5. The capsule according to claim 4, wherein the inner wall portion of the annular channel extends into the plane of the shoulder or the plane of the beginning of the radius between the outer wall portion and the side wall.

6. The capsule according to claim 1, wherein the wall thickness of the inner wall portion is at least 1.5 times to 2 times greater than the wall thickness of the pierceable zone.

7. The capsule according to claim 1, wherein the wall thickness of the inner wall portion is between 0.20 to 0.36 mm and the wall thickness of the pierceable zone is 0.1 to 0.2 mm.

8. The capsule according to claim 1, wherein the inner wall portion defines a cup-like cavity, which extends towards the interior of the capsule and opens towards the outside.

9. The capsule according to claim 1, wherein the base has a central base section defined by the inner wall portion, which section is parallel to the pierceable zone of the base.

10. The capsule according to claim 9, wherein the central base section has a consistent wall thickness that is greater than the thickness of the inner wall portion or outer wall portion, and wherein the consistent wall thickness of the central base section is between 0.50 to 0.70 mm.

11. The capsule according to claim 9, wherein the outer wall portion merges into the side wall of the capsule body by way of a shoulder or by way of a radius, and wherein the central base section runs in the plane of the shoulder or the plane of the beginning of the radius between the outer wall portion and the side wall.

12. The capsule according to claim 9, wherein the central base section is concavely inwardly curved and the inner wall portion merges into the central base section.

13. The capsule according to claim 9, wherein the central base section is convexly outwardly curved and the inner wall portion merges into the central base section.

14. The capsule according to claim 13, wherein the central base section is configured in a flexible manner such that the central base section is capable of being pushed concavely inwards by a force exerted from the outside.

15. The capsule according to claim 1, wherein the capsule body consists of polypropylene.

16. A capsule body for the capsule according to claim 1, wherein the side wall has a stack edge intended for being supported by a further capsule body, which stack edge is arranged such that in the case of stacked capsule bodies inner wall portions of the channels are arranged at a distance from one another.

17. Means for penetrating the base of the capsule according to claim 1, having a base plate with an annular piercing zone on which a plurality of piercing elements are arranged, a frustoconical elevation being arranged in the centre of the piercing zone.

18. The means according to claim 17, wherein the piercing zone forms an annular trough.

19. The means according to claim 18, wherein the piercing elements are designed as multi-surface hollow bodies, at least one of the surfaces being a surface inclined against the piercing direction, on which openings are arranged in a perforated strainer structure.

20. The means according to claim 17, wherein the piercing elements form bodies which taper to a tip or to a cutting edge and have an outflow channel which extends through the base plate and opens out towards at least one side surface of the body.

21. The means according to claim 20, wherein openings in the side surfaces of the bodies are covered by a straining film.

22. The means according to claim 17, wherein the piercing elements are approximately of the same height as the frustoconical elevation in the centre.

23. The means according to claim 17, wherein a helical compression spring is arranged on the frustoconical elevation, a free end of which is adapted to be positioned on the base of a capsule which is pressed against the base plate.

24. A device for preparing a beverage, comprising:
a capsule consisting of a rotationally symmetrically formed capsule body having a side wall, a base formed integrally with the side wall, and a lid which covers the capsule body and is intended for forming a closed chamber that contains a substance for preparing the beverage, the lid and the base being pierceable by means arranged outside the capsule in order for a liquid to be channeled through the chamber from the lid towards the base, wherein the substance rests directly on the base of the capsule, wherein the base comprises an outer wall portion and an inner wall portion for defining an annular channel, wherein the inner wall portion forms a frustoconical stiffening zone which tapers towards the lid, wherein the base further comprises a pierceable zone defined between the outer wall portion and the inner wall portion, and wherein the pierceable zone has consistent wall thickness that is smaller than a wall thickness of the inner wall portion or the outer wall portion,
two chamber parts which are adapted to be pressed against one another to form a closed chamber, one chamber part being designed as a capsule holder with a cavity for accommodating the capsule and the other chamber part being designed as a closure part for closing the cavity, and the base of the cavity and the closure part being provided with a means comprising a base plate with an annular piercing zone on which a plurality of piercing elements are arranged, a frustoconical elevation being arranged in the centre of the piercing zone, such that, when the cavity is closed, the base and the lid of the capsule arranged in the cavity are penetrated in order for the liquid to be channeled through.

* * * * *